United States Patent
Zhu et al.

(10) Patent No.: US 12,205,247 B2
(45) Date of Patent: Jan. 21, 2025

(54) METHOD AND APPARATUS FOR ACQUIRING RAW IMAGE, AND ELECTRONIC DEVICE

(71) Applicant: INTELLINDUST INFORMATION TECHNOLOGY (SHENZHEN) CO., LTD, Shenzhen (CN)

(72) Inventors: Caizhi Zhu, Shenzhen (CN); Xiao Zhou, Shenzhen (CN); Shengning Xiang, Shenzhen (CN); Yaohui Sun, Shenzhen (CN)

(73) Assignee: INTELLINDUST INFORMATION TECHNOLOGY (SHENZHEN) CO., LTD, Shenzhen (CN)

( * ) Notice: Subject to any disclaimer, the term of this patent is extended or adjusted under 35 U.S.C. 154(b) by 338 days.

(21) Appl. No.: 17/786,406

(22) PCT Filed: Dec. 22, 2021

(86) PCT No.: PCT/CN2021/140594
§ 371 (c)(1),
(2) Date: Jun. 16, 2022

(87) PCT Pub. No.: WO2022/135497
PCT Pub. Date: Jun. 30, 2022

(65) Prior Publication Data
US 2023/0245276 A1  Aug. 3, 2023

(30) Foreign Application Priority Data
Dec. 25, 2020 (CN) .......................... 202011560718.8

(51) Int. Cl.
*G06T 5/00* (2024.01)
*G06T 5/60* (2024.01)

(52) U.S. Cl.
CPC ................ *G06T 5/00* (2013.01); *G06T 5/60* (2024.01); *G06T 2207/20081* (2013.01); *G06T 2207/20084* (2013.01)

(58) Field of Classification Search
CPC .... G06T 5/00; G06T 5/60; G06T 5/70; G06T 2207/20081; G06T 2207/20084;
(Continued)

(56) References Cited

U.S. PATENT DOCUMENTS

2020/0234414 A1    7/2020  Zamir et al.
2020/0265567 A1*   8/2020  Hu ............................ G06T 5/50

FOREIGN PATENT DOCUMENTS

CN    109785252 A    5/2019
CN    110458763 A    11/2019
(Continued)

OTHER PUBLICATIONS

Brooks et al. Unprocessing Images for Learned Raw Denoising, IEEE, 2019.*
(Continued)

*Primary Examiner* — John B Strege
(74) *Attorney, Agent, or Firm* — Cozen O'Connor

(57) ABSTRACT

The embodiments of the present disclosure provide a method and an apparatus for acquiring a RAW image, and an electronic device, the method including: obtaining an sRGB image; inputting the sRGB image into a preset image restoration model to obtain an initial RAW image corresponding to the sRGB image, wherein the preset image restoration model is a model obtained by training a preset neural network based on a first preset training set; adding a first preset noise to the initial RAW image to obtain a first noise RAW image; adding a second preset noise to the initial RAW image to obtain a second noise RAW image; inputting the first noise RAW image and the second noise RAW image
(Continued)

into a preset noise addition model to obtain a target RAW image, wherein the preset noise addition model is a model obtained by training a preset neural network based on a second preset training set.

6 Claims, 7 Drawing Sheets

(58) Field of Classification Search
CPC .......... G06T 2207/10024; Y02T 10/40; G06F 18/214; G06N 3/045
See application file for complete search history.

(56) References Cited

FOREIGN PATENT DOCUMENTS

| | | |
|---|---|---|
| CN | 111161181 A | 5/2020 |
| CN | 111401411 A | 7/2020 |
| CN | 111612722 A | 9/2020 |
| CN | 111724317 A | 9/2020 |
| CN | 111798381 A | 10/2020 |
| CN | 111881927 A | 11/2020 |
| CN | 112581401 A | 3/2021 |
| JP | 2004328534 A | 11/2004 |

OTHER PUBLICATIONS

Zamir et al., CycleISP: Real Image Restoration via Improved Data Synthesis, Aug. 2020.*
First Office Action—CN Application No. 202011560718.8, dated Aug. 2, 2022, 9 pages.

* cited by examiner

METHOD AND APPARATUS FOR ACQUIRING RAW IMAGE, AND ELECTRONIC DEVICE

This application requires the priority of the Chinese patent application No. 202011560718.8 filed with the China National Intellectual Property Administration on Dec. 25, 2020, and entitled "METHOD AND APPARATUS FOR ACQUIRING RAW IMAGE, AND ELECTRONIC DEVICE", which is incorporated herein by reference in its entirety.

TECHNICAL FIELD

The present disclosure relates to the technical field of image processing, and in particular, to a method and an apparatus for acquiring a RAW image, and an electronic device.

BACKGROUND

At present, image processing is used in various life scenarios, such as face recognition, and artificial intelligence algorithms such as deep learning are of great importance in the image processing and can be used to replace the functions of traditional ISP (Image Signal Processing). The artificial intelligence algorithm needs algorithm training before it is used. When training the artificial intelligence algorithm, a training set of sample images is essential. In the related art, the training set of sample images is usually a training set of sRGB (standard Red Green Blue) images. However, sRGB images are images subjected to ISP processing, thus all sRGB images are under the same lighting conditions, which makes sRGB images unsuitable for the training of some intelligent algorithms. Therefore, it is necessary to obtain other kinds of training sets of sample images, such as a training set of RAW (initial) images.

SUMMARY

The purpose of the embodiments of the present disclosure is to provide a method and an apparatus for acquiring a RAW image, and an electronic device, so as to solve the problem of lack of training sets of RAW images when training intelligent algorithms in the field of image processing. The specific technical solutions are as follows:

To achieve the above purpose, an embodiment of the present disclosure provides a method for acquiring a RAW image, where the method for acquiring a RAW image includes:

acquiring an sRGB image;

inputting the sRGB image into a preset image restoration model to obtain an initial RAW image corresponding to the sRGB image, wherein the preset image restoration model is a model obtained by training a preset neural network based on a first preset training set, and the first preset training set includes a plurality of sample sRGB images and an initial RAW image corresponding to each of the sample sRGB images;

adding a first preset noise to the initial RAW image to obtain a first noise RAW image;

adding a second preset noise to the initial RAW image to obtain a second noise RAW image; and inputting the first noise RAW image and the second noise RAW image into a preset noise addition model to obtain a target RAW image, wherein the preset noise addition model is a model obtained by training a preset neural network based on a second preset training set, and the second preset training set includes a plurality of first sample noise RAW images and a plurality of second sample noise RAW images, and a target RAW image corresponding to each of the first sample noise RAW images and the second sample noise RAW images.

In some embodiments, the preset image restoration model includes a first low-level feature extraction layer, at least one residual attention network layer, and an image recovery layer;

a step of inputting the sRGB image into a preset image restoration model to obtain an initial RAW image corresponding to the sRGB image includes:

inputting the sRGB image into the first low-level feature extraction layer to obtain first low-level features corresponding to the sRGB image;

inputting the first low-level features into the at least one residual attention network layer to obtain first high-level features corresponding to the first low-level features, and to obtain first combined features determined according to the first low-level features and the first high-level features; and inputting the first combined features into the image recovery layer to obtain the initial RAW image corresponding to the first combined features.

In some embodiments, the residual attention network layer includes at least one attention network sublayer and a residual sublayer;

a step of inputting the first low-level features into the at least one residual attention network layer to obtain first high-level features corresponding to the first low-level features and to obtain first combined features determined according to the first low-level features and the first high-level features includes:

inputting the first low-level features into the at least one attention network sublayer to obtain the first high-level features corresponding to the first low-level features, and first sub-low-level features in the first low-level features; and inputting the first high-level features and the first sub-low-level features into the residual sublayer, and linearly merging the first high-level features and the first sub-low-level features through the residual sublayer to obtain the first combined features.

In some embodiments, the image recovery layer includes a convolution sublayer and a restoration sublayer;

a step of inputting the first combined features into the image recovery layer to obtain the initial RAW image corresponding to the first combined features includes:

inputting the first combined features into the convolution sublayer, and performing convolution processing on the first combined features through the convolution sublayer to obtain first combined features subjected to convolution; and inputting the first combined features subjected to convolution into the restoration sublayer, and performing sub-pixel convolution processing on the first combined features subjected to convolution through the restoration sublayer to obtain the initial RAW image corresponding to the first combined features subjected to convolution.

In some embodiments, the preset noise addition model includes a second low-level feature extraction layer, at least one high-level feature extraction layer, and a synthesis output layer;

a step of inputting the first noise RAW image and the second noise RAW image into a preset noise addition model to obtain a target RAW image includes:

inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image;

inputting the second low-level features into the at least one high-level feature extraction layer to obtain second high-level features corresponding to the second low-level features, and to obtain second combined features determined according to the second low-level features and the second high-level features; and inputting the second combined features into the synthesis output layer, and performing convolution processing on the second combined features through the synthesis output layer to obtain the target RAW image corresponding to the second combined features.

In some embodiments, the second low-level feature extraction layer includes a low-level feature extraction sublayer and a low-level feature combination sublayer;

a step of inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image includes:

inputting the first noise RAW image and the second noise RAW image into the low-level feature extraction sublayer, performing convolution processing on the first noise RAW image through the low-level feature extraction sublayer to obtain third low-level features of the first noise RAW image, and performing convolution processing on the second noise RAW image through the low-level feature extraction sublayer to obtain fourth low-level features of the second noise RAW image; and inputting the third low-level features and the fourth low-level features into the low-level feature combination sublayer, and linearly merging the third low-level features and the fourth low-level features through the low-level feature combination sublayer to obtain the second low-level features.

In some embodiments, the at least one high-level feature extraction layer includes at least one high-level feature extraction sublayer and a high-level feature combination sublayer;

a step of inputting the second low-level features into the at least one high-level feature extraction layer to obtain second high-level features corresponding to the second low-level features and to obtain second combined features determined according to the second low-level features and the second high-level features includes:

inputting the second low-level features into the at least one high-level feature extraction sublayer to obtain second high-level features corresponding to the second low-level features, and to obtain second sub-low-level features in the second low-level features; and inputting the second high-level features and the second sub-low-level features into the high-level feature combination sublayer, and linearly merging the second high-level features and the second sub-low-level features through the high-level feature combination sublayer to obtain the second combined features.

In order to achieve the above purpose, an embodiment of the present disclosure further provides an apparatus for acquiring a RAW image, where the apparatus for acquiring a RAW image includes:

an acquisition module configured for acquiring an sRGB image;

a first input module configured for inputting the sRGB image into a preset image restoration model to obtain an initial RAW image corresponding to the sRGB image, wherein the preset image restoration model is a model obtained by training a preset neural network based on a first preset training set, and the first preset training set includes a plurality of sample sRGB images and an initial RAW image corresponding to each of the sample sRGB images;

a first adding module configured for adding a first preset noise to the initial RAW image to obtain a first noise RAW image;

a second adding module configured for adding a second preset noise to the initial RAW image to obtain a second noise RAW image; and a second input module configured for inputting the first noise RAW image and the second noise RAW image into a preset noise addition model to obtain a target RAW image, wherein the preset noise addition model is a model obtained by training a preset neural network based on a second preset training set, and the second preset training set includes a plurality of first sample noise RAW images and a plurality of second sample noise RAW images, and a target RAW image corresponding to each of the first sample noise RAW images and the second sample noise RAW images.

In some embodiments, the preset image restoration model includes a first low-level feature extraction layer, at least one residual attention network layer, and an image recovery layer:

the first input module includes:

a first input sub-module configured for inputting the sRGB image into the first low-level feature extraction layer to obtain first low-level features corresponding to the sRGB image;

a second input sub-module configured for inputting the first low-level features into the at least one residual attention network layer to obtain the first high-level features corresponding to the first low-level features, and to obtain first combined features determined according to the first low-level features and the first high-level features; and a third input sub-module configured for inputting the first combined features into the image recovery layer to obtain the initial RAW image corresponding to the first combined features.

In some embodiments, the residual attention network layer includes at least one attention network sublayer, and a residual sublayer;

the second input sub-module is specifically configured for:

inputting the first low-level features into the at least one the attention network sublayer to obtain the high-level features corresponding to the first low-level features and the first sub-low-level features in the first low-level features; and inputting the first high-level features and the first sub-low-level features into the residual sublayer, and linearly merging the first high-level features and the first sub-low-level features through the residual sublayer to obtain the first combined features.

In some embodiments, the image recovery layer includes an image convolution sublayer and a restoration sublayer;

the third input sub-module is specifically configured for:

inputting the first combined features into the image convolution sublayer, and performing convolution processing on the combined features through the image convolution sublayer to obtain the first combined features subjected to convolution; and inputting the first combined features subjected to convolution into the restoration sublayer, and performing the sub-pixel convolution processing on the first combined features subjected to convolution by the restoration sublayer to obtain the initial RAW image corresponding to the first combined features subjected to convolution.

In some embodiments, the preset noise addition model includes a second low-level feature extraction layer, at least one high-level feature extraction layer, and a synthesis output layer;

the second input module includes:

a fourth input sub-module configured for inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image;

a fifth input sub-module configured for inputting the second low-level features into at least one high-level feature extraction layer to obtain second high-level features corresponding to the second low-level features, and to obtain second combined features determined according to the second low-level features and the second high-level features; and a sixth input sub-module configured for inputting the second combined features into the synthesis output layer, and performing convolution processing on the second combined features through the synthesis output layer to obtain a target RAW image corresponding to the second combined features.

In some embodiments, the second low-level feature extraction layer includes a low-level feature extraction sublayer and a low-level feature combination sublayer;

the fourth input sub-module is specifically configured for:

inputting the first noise RAW image and the second noise RAW image into the low-level feature extraction sublayer, performing convolution processing on the first noise RAW image through the low-level feature extraction sublayer to obtain third low-level features of the first noise RAW image, and performing convolution processing on the second noise RAW image through the low-level feature extraction sublayer to obtain fourth low-level features of the second noise RAW image; and inputting the third low-level features and the fourth low-level features into the low-level feature combination sublayer, and linearly merging the third low-level features and the fourth low-level features through the low-level features combination sublayer to obtain the second low-level features.

In some embodiments, the at least one high-level feature extraction layer includes at least one high-level feature extraction sublayer, and a high-level feature combination sublayer;

the fifth input sub-module is specifically configured for:

inputting the second low-level features into the at least one high-level feature extraction sublayer to obtain the second high-level features corresponding to the second low-level features, and second sub-low-level features in the second low-level features; and inputting the second high-level features and the second sub-low-level features into the high-level feature combination sublayer, and linearly merging the second high-level features and the second sub-low-level features through the high-level feature combination sublayer to obtain the second combined features.

In order to achieve the above purpose, an embodiment of the present disclosure also provides an electronic device, the electronic device includes a processor, a communication interface, a memory, and a communication bus, wherein the processor, the communication interface, and the memory communicate with each other through the communication bus; wherein the memory is configured for storing computer programs; and the processor is configured for implementing steps of any of the above-mentioned methods for acquiring a RAW image when executing the program stored in the memory.

In order to achieve the above purpose, an embodiment of the present disclosure further provides a computer-readable storage medium, in which computer programs are stored, and when the computer programs are executed by the processor, steps of any of the above-mentioned methods are implemented.

The embodiments of the present disclosure provide following beneficial effects.

The embodiments of the present disclosure provide a method and an apparatus for acquiring a RAW image, and an electronic device. The method includes: acquiring an sRGB image, inputting the acquired sRGB image into a preset image restoration model trained in advance, processing the sRGB image through the preset image restoration model, and obtaining an initial RAW image corresponding to the sRGB image; then adding a first preset noise to the initial RAW image to obtain a first noise RAW image, and adding a second preset noise to the initial RAW image to obtain a second noise RAW image; inputting the first noise RAW image and the second noise RAW image into the preset noise addition model to obtain a target RAW image subjected to noise addition. In the above method for acquiring a RAW image, the preset image restoration model is used to obtain based on the sRGB image the initial RAW image without noise addition; then different noises are added to the initial RAW image to simulate the influence of different light on the RAW image; then the initial RAW image is combined with a variety of noises through a preset noise addition model to obtain a target RAW image with at least two noises added. In this way, a variety of RAW images in different light environments can be obtained based on a small number of sRGB images, and then a training set of RAW images required for training intelligent algorithms in the field of image processing can be obtained.

Of course, it is not necessary for any product or method implementing the present disclosure to achieve all the advantages described above at the same time.

BRIEF DESCRIPTION OF THE DRAWINGS

In order to explain the embodiments of the present disclosure and the technical solutions of the prior art more clearly, the drawings used in the embodiments and the prior art will be described briefly in the following, and it is apparent that the drawings in the description below are only some embodiments of the present disclosure and those skilled in the art can obtain other drawings according to these drawings without inventive efforts.

DETAILED DESCRIPTION OF THE INVENTION

In order to make the purpose, technical means and advantages of the present disclosure clearer, the present disclosure will be further explained in detail below with reference to the accompanying drawings. Obviously, the embodiments described are only part of the embodiments of the present disclosure, not all of them. Based on the embodiments in the present application, all other embodiments obtained by those of ordinary skill in the art on the basis of the present disclosure fall under the protection of the present application.

In order to solve the problem of lack of the training set of RAW images in training of an intelligent algorithm in the field of image processing, embodiments of the present disclosure provide a method and an apparatus for acquiring a RAW image, and an electronic device. The method and the apparatus for acquiring a RAW image, and the electronic device will be described in detail.

Figure 1:
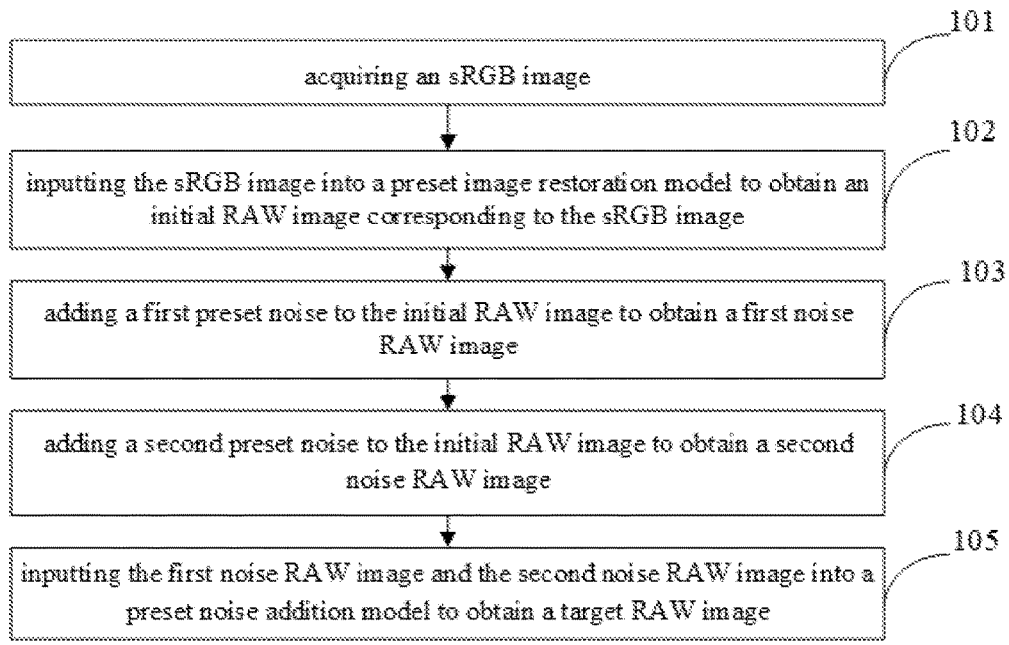
FIG. 1 is a flowchart of a method for acquiring a RAW image according to the embodiment of the present disclosure.

As shown in FIG. 1, the method for acquiring a RAW image provided by the embodiment of the present disclosure includes the following steps.

Step 101, acquiring an sRGB image.

In the embodiment of the present disclosure, the sRGB image is an image obtained by performing image signal processing on an original image, which is conformed to the sRGB color language protocol. sRGB images can be acquired in a variety of ways. In an example, the target person or object can be captured by a camera, and then the image signal processing is performed on the captured original image to obtain an sRGB image. In another example, it can also directly retrieve the target number of sRGB images from an sRGB sample image library, wherein the sRGB sample image library is a database established in advance to supply for training of intelligent algorithms used in the field of image processing such as face recognition. The sRGB images may also be acquired in other ways, which is not specifically limited in the embodiment of the present disclosure.

Step 102: inputting the sRGB image into a preset image restoration model to obtain an initial RAW image corresponding to the sRGB image. Herein the preset image restoration model is a model obtained by training a preset neural network based on a first preset training set, and the first preset training set includes a plurality of sample sRGB images and an initial RAW image corresponding to each of the sample sRGB images.

Figure 2:
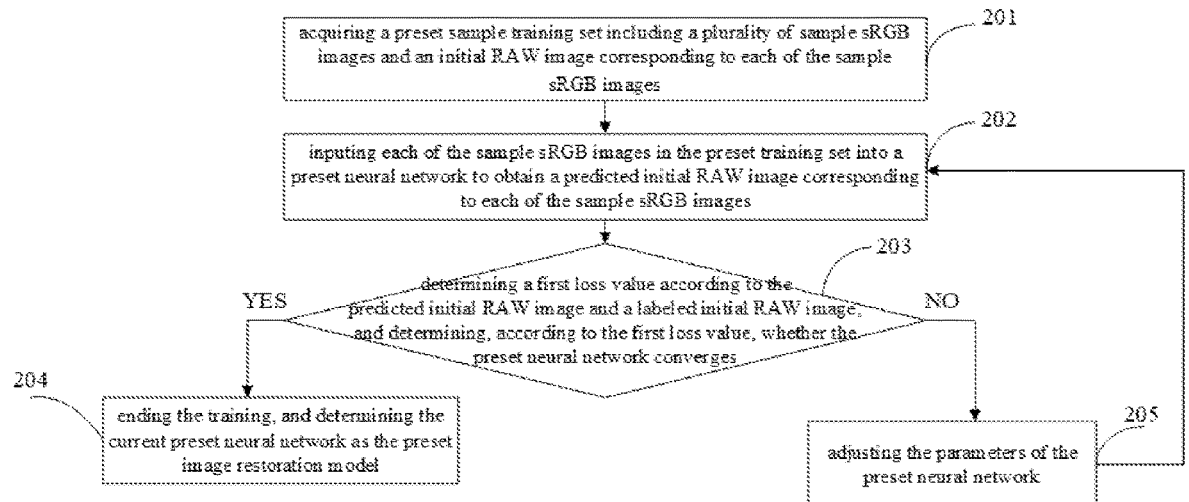
FIG. 2 is a flowchart of a method for training a preset image restoration model according to the embodiment of the present disclosure.

In the embodiment of the present disclosure, the preset image restoration model is a trained model in advance, which is used to restore the sRGB image to the initial RAW image corresponding to the sRGB image. Herein the initial RAW image can be understood as a RAW image in a fixed light environment. The preset image restoration model is a model obtained by training a preset neural network based on a plurality of sample sRGB images and each of the sample sRGB images. Herein, as shown in FIG. 2, the preset image restoration model can be obtained through following training steps.

Step 201: acquiring a preset sample training set including a plurality of sample sRGB images and an initial RAW image corresponding to each of the sample sRGB images.

Herein the preset sample training set can be acquired directly from an sRGB sample image library established in advance, or obtained by performing image signal processing on a plurality of original image files, or obtained by other methods, which are not specifically limited in the embodiments of the present disclosure.

Step 202: inputting each of the sample sRGB images in the preset training set into a preset neural network to obtain a predicted initial RAW image corresponding to each of the sample sRGB images.

Herein, the predicted initial RAW image of the sample sRGB image can be obtained in a manner with a single sample size of one, where one sample sRGB image is inputted into the preset neural network each time. The predicted initial RAW image is the RAW image outputted by the preset neural network under current parameters.

Step 203: determining a first loss value according to the predicted initial RAW image and a labeled initial RAW image, and determining, according to the first loss value, whether the preset neural network converges; if the preset neural network converges, executing step 204; if the preset neural network does not converge, executing step 205.

Herein the labeled initial RAW image is a preset, correct initial RAW image corresponding to the sRGB image. In the embodiment of the present disclosure, the predicted initial RAW image and the labeled initial RAW image can be processed together through the mean squared difference function and the perceptual loss function to determine the difference between the predicted initial RAW image and the labeled initial RAW image, that is, the first loss value. Herein, the mean squared difference function can be used to determine the difference between the low-level features of the predicted initial RAW image and the low-level features of the predicted initial RAW image, and the perceptual loss function is used to determine the difference between the high-level features of the predicted initial RAW image and the high-level features of the predicted initial RAW image.

The first loss value may also be determined through other loss functions, such as a root mean square error loss function, a mean absolute error loss function, and the like, which is not specifically limited in the embodiment of the present disclosure.

Step 204, if the preset neural network converges, ending the training, and determining the current preset neural network as the preset image restoration model.

Step 205, if the preset neural network does not converge, adjusting the parameters of the preset neural network, and returning to step 202 to start a new round of training.

Herein the first loss value is used to indicate the difference value between the predicted initial RAW image and the labeled initial RAW image. The process of determining whether the preset neural network converges according to the first loss value may be as follows: if the first loss value is higher than a preset difference threshold, it is determined that the preset neural network does not converge, then the parameters of the preset neural network are adjusted, and the sample sRGB image is re-inputted into the preset neural network the parameters of which having been adjusted, to start a new round of training; if the first loss value is lower than the preset difference threshold, it is determined that the preset neural network converges, and the current preset neural network is determined as the preset image restoration model. Other methods may also be used to determine whether the preset neural network converges, which is not specifically limited in the embodiment of the present disclosure. For example, if the number of iterations reaches a preset threshold, it is determined that the preset neural network converges.

Figure 3:
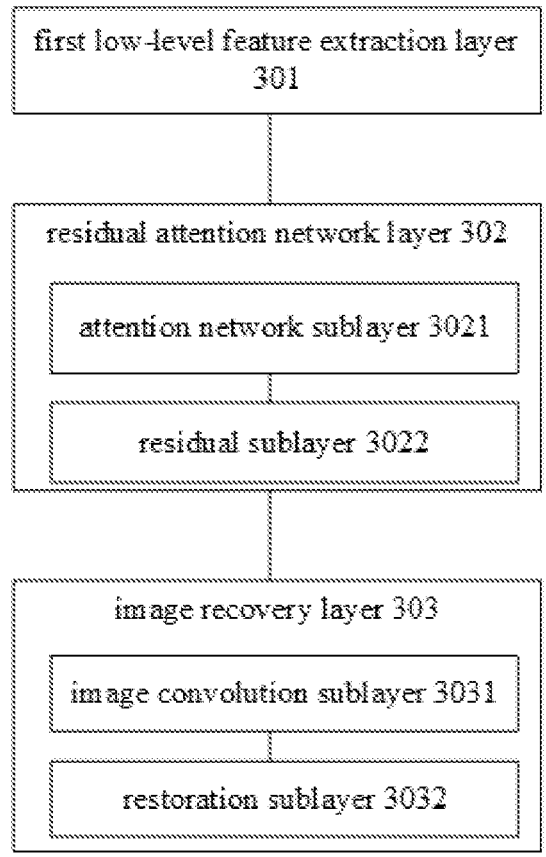
FIG. 3 is a structural diagram of a preset image restoration model according to the embodiment of the present disclosure.
Figure 4:
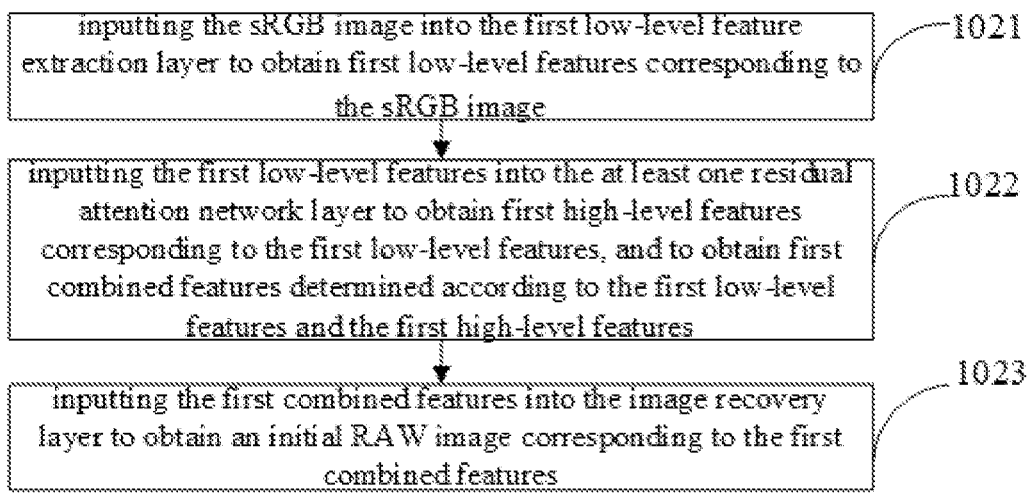
FIG. 4 is a flowchart of a method for acquiring an initial RAW image according to the embodiment of the present disclosure.

In some embodiments, as shown in FIG. 3, the preset image restoration model includes: a first low-level feature extraction layer 301, at least one residual attention network layer 302 (In FIG. 3, explanations are provided by taking the preset image restoration model including one residual attention network layer 302 as an example), and an image recovery layer 303. The step 102 can be refined into the following steps, as shown in FIG. 4.

Step 1021: inputting the sRGB image into the first low-level feature extraction layer to obtain first low-level features corresponding to the sRGB image.

In the embodiment of the present disclosure, the first low-level feature extraction layer is used to perform convolution processing on the sRGB image, so as to extract the first low-level features corresponding to the sRGB image. Herein, the first low-level features corresponding to the sRGB image include, but is not limited to, outline, edge, color, texture, and shape features of the image.

In the embodiment of the present disclosure, the first feature extraction layer may include two convolution sublayers, and each of the convolution sublayers includes a convolution kernel of 3×3. The sRGB image is inputted into the two convolutional sublayers in proper order, so that the two convolutional sublayers can extract the first low-level features corresponding to the sRGB image. The first low-level features may be outputted in the form of a feature matrix, and the first low-level features may include multiple low-level feature matrices. For example, the first low-level features are divided into four low-level feature matrices according to color, namely R(red) low-level feature matrix, G1(green) low-level feature matrix, G2 low-level feature matrix and B(blue) low-level feature matrix.

Step 1022: inputting the first low-level features into the at least one residual attention network layer to obtain first high-level features corresponding to the first low-level features, and to obtain first combined features determined according to the first low-level features and the first high-level features.

In the embodiment of the present disclosure, the residual attention network in the residual attention network layer can be understood as the combination of the residual network and the attention mechanism, that is, the residual network using the attention mechanism. The first high-level features are extracted from the first low-level features through the residual attention network layer, that is, the first low-level features are adaptively adjusted through the interdependence between network channels, so as to obtain the first high-level features based on the first low-level features. In addition, the residual attention network layer is also used to select part of the first low-level features from the first low-level features and then combine the part of the first low-level features with the first high-level features to obtain the first combined features. Wherein the first low-level features and the first high-level features may be combined by linearly adding the first low-level features and the first high-level features to obtain the first combined features. Herein the first combined features can be outputted in the form of a matrix. It should be noted that when the first low-level features are divided into four low-level feature matrices based on color, the first combined feature matrix also includes: R combined feature matrix, G1 combined feature matrix, G2 combined feature matrix and B combined feature matrix.

In the embodiment of the present disclosure, the preset image restoration model may include multiple residual attention network layers. When the preset image restoration model includes multiple residual attention network layers, the first low-level features are inputted into multiple residual attention network layers in proper order. The number of residual attention network layers can be set according to actual conditions, such as three, four, etc., which is not specifically limited in the embodiment of the present disclosure.

Figures 5, 6:
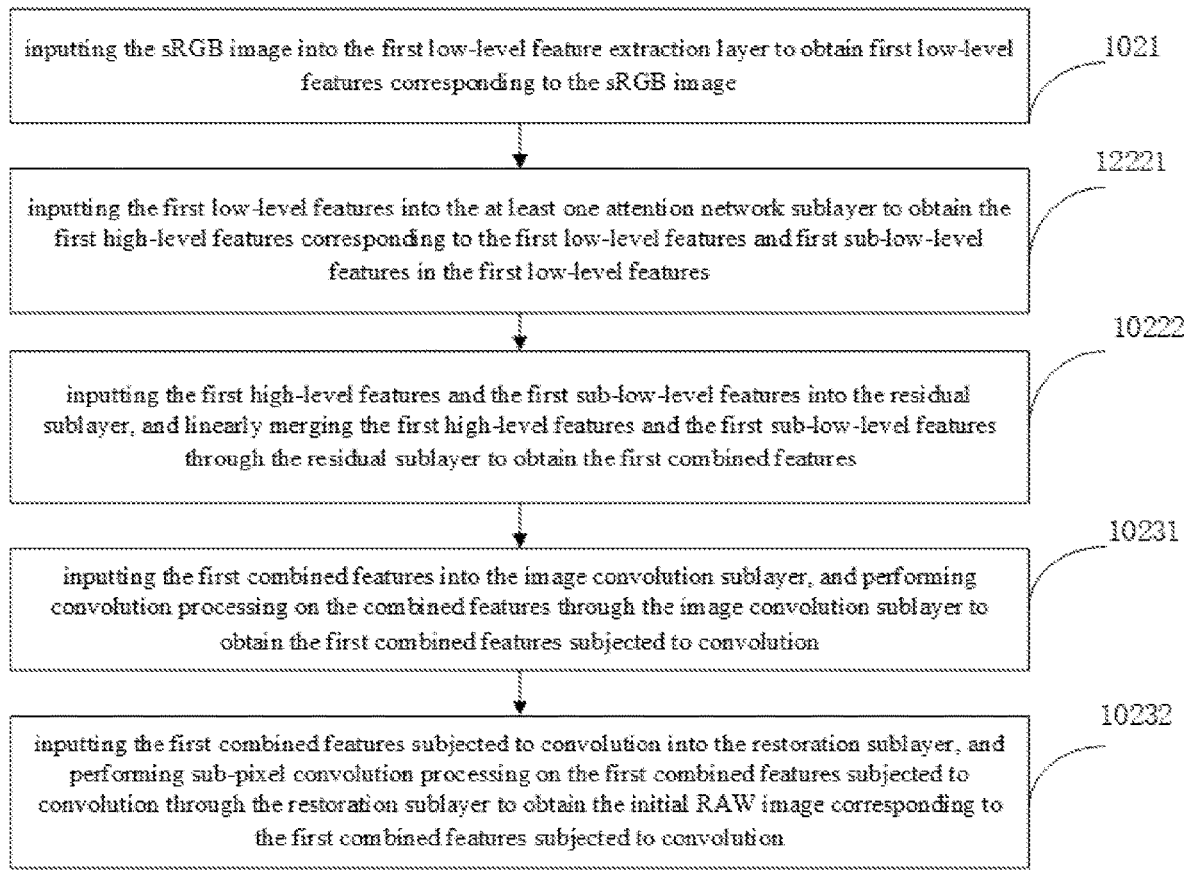
FIG. 5 is another flowchart of a method for acquiring an initial RAW image according to the embodiment of the present disclosure.
FIG. 6 is schematic diagram of an initial RAW image according to the embodiment of the present disclosure.

In some embodiments, as shown in FIG. 3, the residual attention network layer 302 includes at least one attention network sublayer 3021 (In FIG. 3, explanations are provided by taking the residual attention network layer 302 including one attention network sublayer 3021 as an example), and a residual sublayer 3022. The Step 1022 can be refined into the following steps, as shown in FIG. 5.

Step 10221: inputting the first low-level features into the at least one attention network sublayer to obtain the first high-level features corresponding to the first low-level features and first sub-low-level features in the first low-level features.

In the embodiment of the present disclosure, the attention network sublayer is used to extract the first high-level features corresponding to the first low-level features from the first low-level features. Herein, the first high-level features are features that can be seen by the human eyes in the image. For example, if the content of the image is a human face, when the high-level features are extracted from the image, the high-level features can show a relatively rough human face.

The attention network sublayer can also be used to select the first sub-low-level features from the first low-level features for combination with the first high-level features. Herein, the first sub-low-level features are automatically selected by the attention network sublayer. When the algorithms in the attention network sublayer are different, the selected first sub-low-level feature will also be different.

In the embodiment of the present disclosure, the residual attention network layer may include multiple attention network sublayers, and the multiple attention network sublayers may be stacked arranged. When the residual attention network layer includes multiple attention network sublayers, the first low-level features are inputted into the multiple attention network sublayers in proper order. The number of attention network sublayers may be set according to actual conditions, which is not specifically limited in this embodiment of the present disclosure.

After the first low-level features are processed and the first high-level features and the first sub-low-level features are obtained, the attention network sublayer is also used to suppress the low-level features except the first sub-low-level features in the first low-level features, and to input the first high-level features and the first sub-low-level features into the residual sublayer.

Step 10222: inputting the first high-level features and the first sub-low-level features into the residual sublayer, and linearly merging the first high-level features and the first sub-low-level features through the residual sublayer to obtain the first combined features.

In the embodiment of the present disclosure, after acquiring the first high-level features and the first sub-low-level features, the residual sublayer linearly merges the first high-level features and the first sub-low-level features, such as linearly adding the first high-level features and the first sub-low-level features, etc., to obtain the first combined features, and inputs the first combined features into the image recovery layer. The residual sublayer may also combine the first high-level features with the first sub-low-level features in other ways, which is not specifically limited in the embodiment of the present disclosure.

Step 1023: inputting the first combined features into the image recovery layer to obtain an initial RAW image corresponding to the first combined features.

In the embodiment of the present disclosure, the image recovery layer is used to convert the first combined features into an initial RAW image. There are several ways in which the image recovery layer converts the first combined features into the initial RAW image. In an example, the first combined features are inputted into the image recovery layer in the form of a combined feature matrix, and the image recovery layer maps each element in the combined feature matrix to a corresponding position of the element in the image to obtain the initial RAW image.

In some embodiments, as shown in FIG. 3, the image recovery layer 303 includes an image convolution sublayer 3031 and a restoration sublayer 3032. The step 1023 can be refined into the following steps, as shown in FIG. 5.

Step 10231: inputting the first combined features into the image convolution sublayer, and performing convolution processing on the combined features through the image convolution sublayer to obtain the first combined features subjected to convolution.

In the embodiment of the present disclosure, the image convolution sublayer may include a convolution kernel of 5×5, which is then used to perform convolution processing on the first combined features to obtain the first combined features subjected to convolution. The image convolution sublayer is used to make the preset neural network converge faster during the process of training the preset image restoration model.

Step 10232: inputting the first combined features subjected to convolution into the restoration sublayer, and performing sub-pixel convolution processing on the first combined features subjected to convolution through the restoration sublayer to obtain the initial RAW image corresponding to the first combined features subjected to convolution.

In the embodiment of the present disclosure, the restoration sublayer is used to perform sub-pixel convolution processing on the first combined features subjected to convolution, so as to convert the first combined features into the initial RAW image.

For example, the first combined features are represented as a combined feature matrix, and the combined feature matrix includes R combined feature matrix, G1 combined feature matrix, G2 combined feature matrix, and B combined feature matrix. R combined feature matrix contains elements: R1, R2, R3, R4; G1 combined feature matrix contains elements: G11, G12, G13, G14; G2 combined feature matrix contains elements: G21, G22, G23, G24; and B combined feature matrix contains elements: B1, B2, B3, B4. After the sub-pixel convolution processing is performed on the first combined features, the elements in above four combined feature matrices can be mapped to an image in a specific order, and the initial RAW image obtained after the mapping is shown in FIG. 6.

Step 103, adding a first preset noise to the initial RAW image to obtain a first noise RAW image.

In the embodiment of the present disclosure, the first preset noise includes, but is not limited to, Poisson noise, readout noise, and the like. The Poisson noise is the noise that is generated during photons are converted into electrons and conforms to the Poisson distribution. The readout noise is the noise that is generated by the circuit method and the analog-to-digital conversion process and conforms to the Gaussian distribution. The readout noise includes thermal noise, quantization noise and fixed pattern noise.

Step 104, adding a second preset noise to the initial RAW image to obtain a second noise RAW image.

In the embodiment of the present disclosure, the second preset noise includes, but is not limited to, Poisson noise, readout noise, etc., and the second preset noise is different from the first preset noise. By adding different types and different amounts of noise to the initial RAW images, RAW images under various light modes are obtained, which increases the types and amounts of RAW images.

Step 105, inputting the first noise RAW image and the second noise RAW image into a preset noise addition model to obtain a target RAW image. Herein, the preset noise addition model is a model obtained by training a preset neural network based on a second preset training set. The second preset training set includes multiple first sample noise RAW images and multiple second sample noise RAW images, and a target RAW image corresponding to each of the first sample noise RAW images and each of the second sample noise RAW images.

In the method for acquiring an RAW image provided by the embodiment of the present disclosure, after the sRGB image is acquired, the acquired sRGB image is inputted into a preset image restoration model trained in advance, and the sRGB image is processed by the preset image restoration model to obtain the initial RAW image corresponding to the sRGB image, and then a first preset noise is added to the initial RAW image to obtain a first noise RAW image, and a second preset noise is added to the initial RAW image to obtain a second noise RAW image. The first noise RAW image and the second noise RAW image are inputted into the preset noise addition model to obtain the target RAW image subjected to noise addition.

In the above method for acquiring an RAW image, the preset image restoration model is used to obtain based on the sRGB image the initial RAW image without noise addition; then different noises are added to the initial RAW image to simulate the influence of different light on the RAW image; then the initial RAW image is combined with a variety of noises through a preset noise addition model to obtain a target RAW image with at least two noises added. In this way, a variety of RAW images in different light environments can be obtained based on a small number of sRGB images, and then a training set of RAW images required for training intelligent algorithms in the field of image processing can be obtained.

In the embodiment of the present disclosure, in order to make the first preset noise and the second preset noise added to the initial RAW image be better combined, so that the target RAW image subjected to noise addition is more in line with the RAW image under real light, the first noise RAW image with the first preset noise added and the second noise RAW image with the second preset noise added are input into the preset noise addition model trained in advance at the same time, and the target RAW image is outputted through the processing of the preset noise addition model on the first noise RAW image and the second noise RAW image, which contains the first preset noise and the second preset noise.

Figure 7:
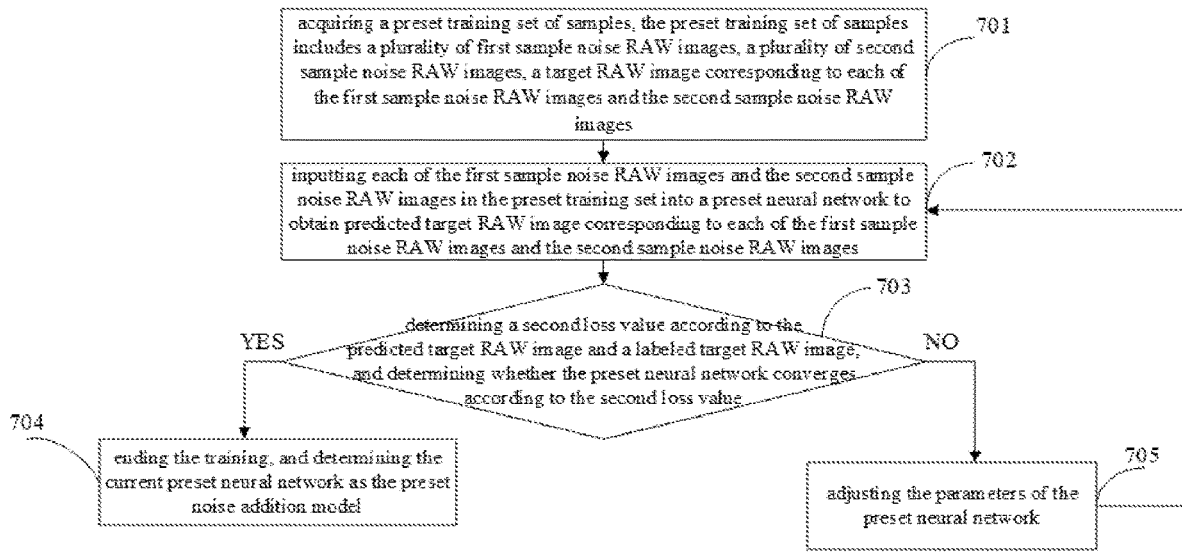
FIG. 7 is a flowchart of a method for training a preset noise addition model according to the embodiment of the present disclosure.

The preset noise addition model is a model obtained by training the preset neural network based on a plurality of the first sample noise RAW images, a plurality of the second sample noise RAW images, the target raw image corresponding to each of the first sample noise RAW images and the second sample noise RAW images. As shown in FIG. 7, the preset noise addition model can be obtained by training through the following steps.

Step 701, acquiring a preset training set of samples, the preset training set of samples includes a plurality of first sample noise RAW images, a plurality of second sample noise RAW images, a target RAW image corresponding to each of the first sample noise RAW images and the second sample noise RAW images.

Step 702, inputting each of the first sample noise RAW images and the second sample noise RAW images in the preset training set into a preset neural network to obtain predicted target RAW image corresponding to each of the first sample noise RAW images and the second sample noise RAW images.

Step 703, determining a second loss value according to the predicted target RAW image and a labeled target RAW image, and determining whether the preset neural network converges according to the second loss value; if the preset neural network converges, executing step 704; if the preset neural network does not converge, executing step 705.

Step 704, if the preset neural network converges, ending the training, and determining the current preset neural network as the preset noise addition model.

Step 705, if the preset neural network does not converge, adjusting the parameters of the preset neural network, and returning to step 702 to start a new round of training.

Steps 701 to 705 are similar to steps 201 to 205. References may be made to the descriptions of steps 201 to 205 for details, which will not be repeated here.

In the embodiment of the present disclosure, the first preset noise and the second preset noise are fitted by a preset noise addition model, so that the target RAW image is more in line with the RAW image under real low light conditions.

In some embodiments, the first preset noise and the second preset noise may be directly added to the initial RAW image to obtain the target RAW image, thereby reducing the difficulty and complexity of adding noise to the initial RAW image.

Figure 8:
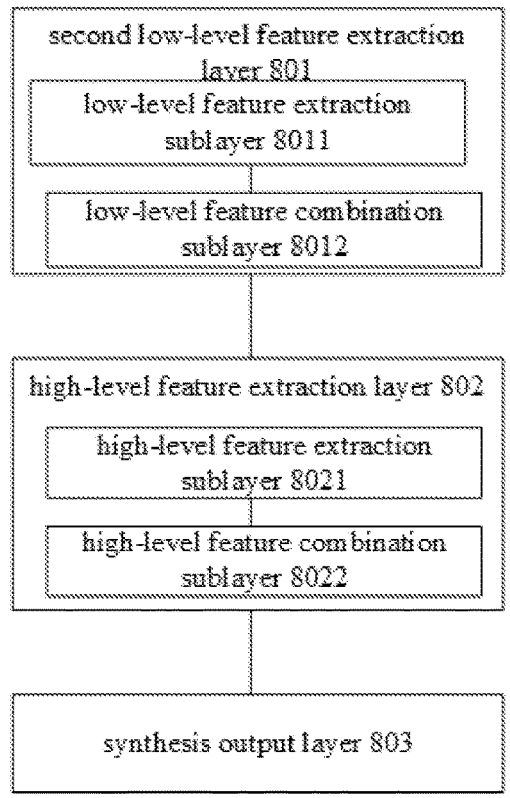
FIG. 8 is a structural diagram of a preset noise addition model according to the embodiment of the present disclosure.
Figure 9:
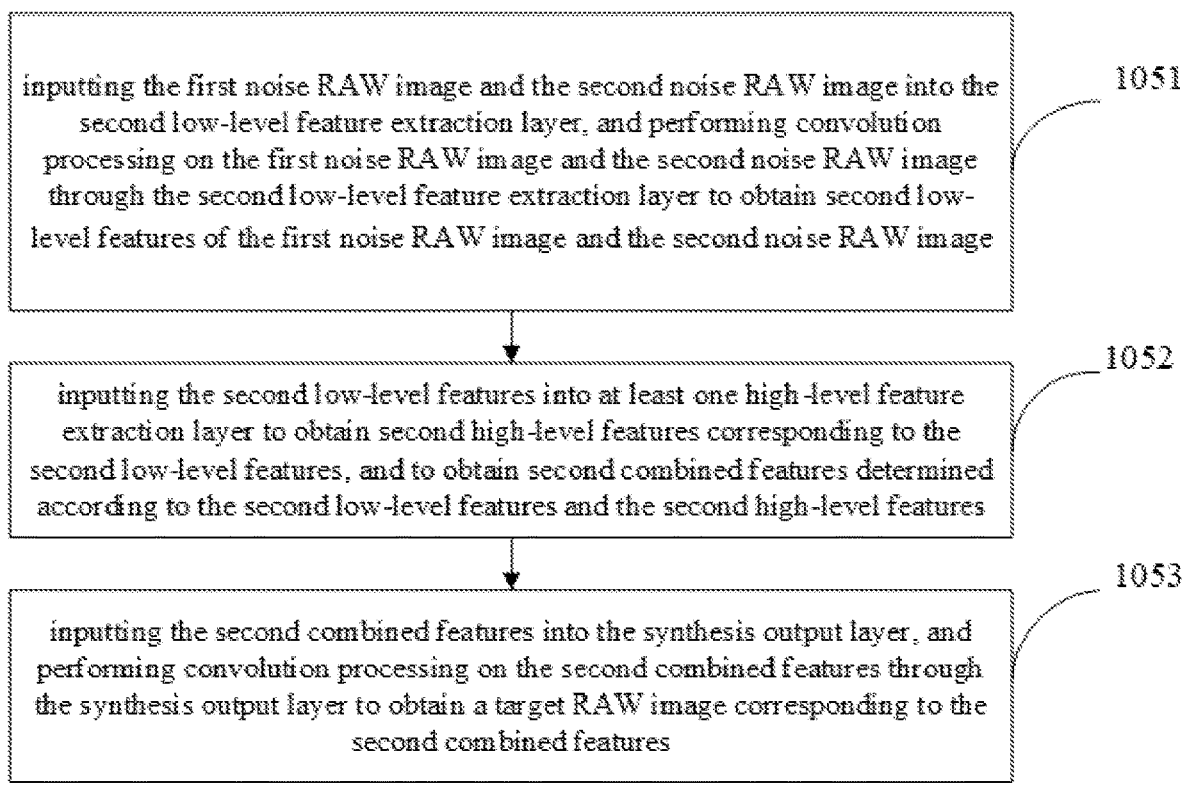
FIG. 9 is a flowchart of a method for acquiring a target RAW image according to the embodiment of the present disclosure.

In some embodiments, the preset noise addition model includes, as shown in FIG. 8, a second low-level feature extraction layer 801, at least one high-level feature extraction layer 802 (in FIG. 8, descriptions are provided by taking the preset noise addition model including one high-level feature extraction layer 802 as an example), and a synthesis output layer 803. Step 105 can be refined into the following steps, as shown in FIG. 9.

Step 1051: inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image.

In the embodiment of the present disclosure, the second low-level feature extraction layer is used to perform convolution processing on the first noise RAW image to extract the low-level features of the first noise RAW image, and to perform convolution processing on the second noise RAW image to obtain the low-level features of the second noise RAW image. The low-level features of the first noise RAW image are then combined with the low-level features of the second noise RAW image to obtain second low-level features, and the second low-level features are inputted into at least one high-level feature extraction layer.

The second feature extraction layer may include two convolution kernels of 3×3, and convolution of the first noise RAW image and the second noise RAW image are performed through the two convolution kernels of 3×3, and the low-level features of the first noise RAW image and the second noise RAW image are extracted.

Figure 10:
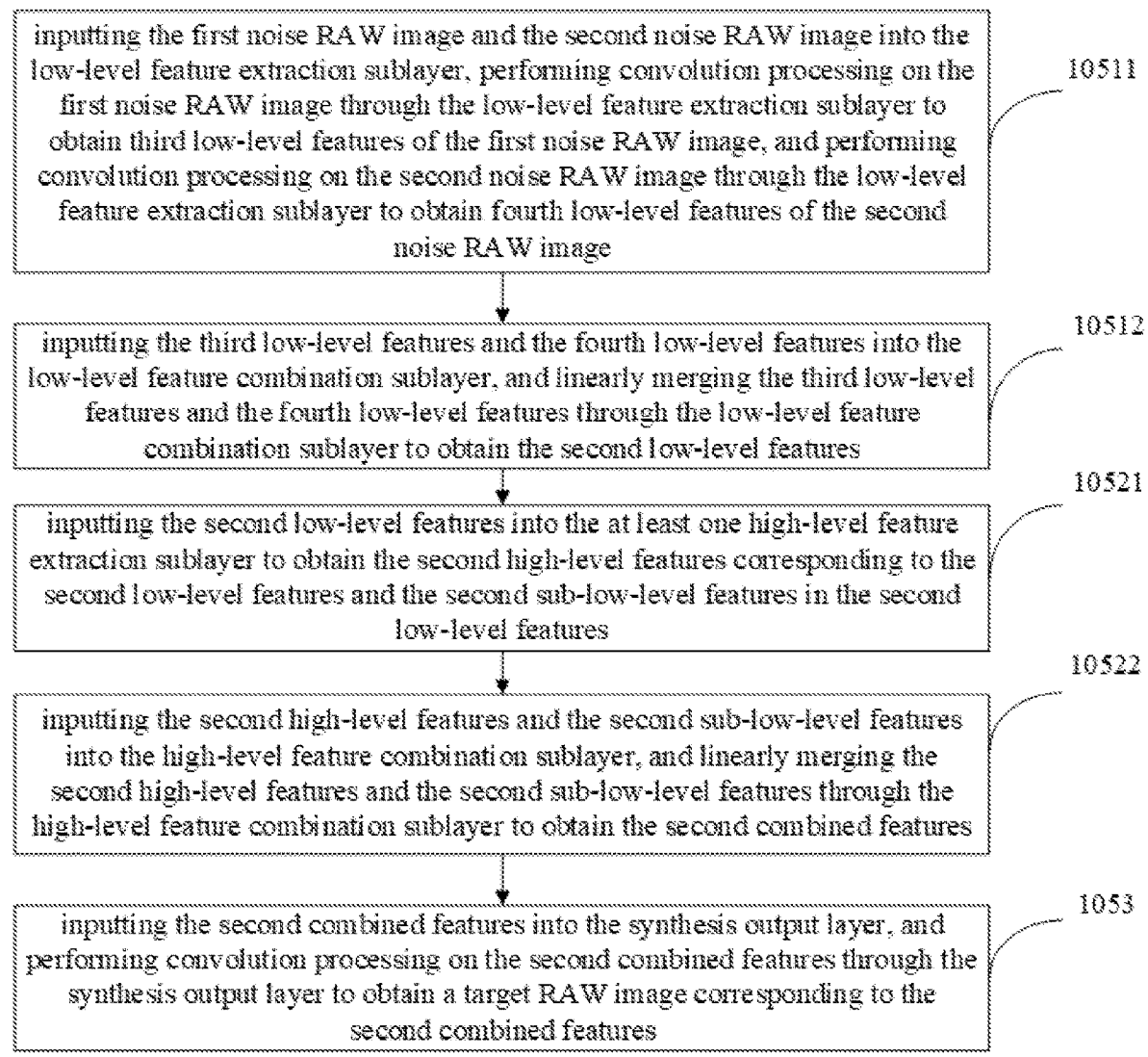
FIG. 10 is another flowchart of a method for acquiring a target RAW image according to the embodiment of the present disclosure.

In some embodiments, as shown in FIG. 8, the second low-level feature extraction layer 801 includes a low-level feature extraction sublayer 8011 and a low-level feature combination sublayer 8012. Step 1051 can be refined into the following steps, as shown in FIG. 10.

Step 10511: inputting the first noise RAW image and the second noise RAW image into the low-level feature extraction sublayer, performing convolution processing on the first noise RAW image through the low-level feature extraction sublayer to obtain third low-level features of the first noise RAW image, and performing convolution processing on the second noise RAW image through the low-level feature extraction sublayer to obtain fourth low-level features of the second noise RAW image.

In the embodiment of the present disclosure, the low-level feature extraction sublayer is used to perform convolution processing on the first noise RAW image to extract the low-level features of the first noise RAW image, that is, the third low-level features. The low-level feature extraction sublayer is also used to perform convolution processing on the second noise RAW image to extract the low-level features of the second noise RAW image, that is, the fourth low-level features. The third low-level features and the fourth low-level features are then outputted.

Step 10512: inputting the third low-level features and the fourth low-level features into the low-level feature combination sublayer, and linearly merging the third low-level features and the fourth low-level features through the low-level feature combination sublayer to obtain the second low-level features.

In the embodiment of the present disclosure, in order to combine the first noise RAW image and the second noise RAW image, so as to realize the fitting of the first preset noise and the second preset noise, the extracted third low-level features and fourth low-level features are inputted into the feature combination sublayer, so that the feature combination sublayer linearly merging the third low-level features and the fourth low-level features, for example linearly adding the third low-level features and the fourth low-level features, etc., to obtain the second low-level features, and to output the second low-level features.

Step 1052, inputting the second low-level features into at least one high-level feature extraction layer to obtain second high-level features corresponding to the second low-level features, and to obtain second combined features determined according to the second low-level features and the second high-level features.

In the embodiment of the present disclosure, the at least one high-level feature extraction layer is used to extract the second high-level features from the second low-level features, so as to realize a further combination of the first noise RAW image and the second noise RAW image. The at least one high-level feature extraction layer is also used to extract part of the second low-level features from the second low-level features, and then combine the part of the second low-level features with the second high-level features to obtain second combined features. The second low-level features and the second high-level features may be combined by linearly adding the second low-level features to the second high-level features to obtain the second combined features.

In the embodiment of the present disclosure, the preset noise addition model may include multiple high-level feature extraction layers, and when the preset noise addition model includes multiple high-level feature extraction layers, the second low-level features are inputted into the multiple high-level feature extraction layers in proper order. The number of high-level feature extraction layers may be set according to actual conditions, such as three or four, etc., which is not specifically limited in the embodiment of the present disclosure.

In some embodiments, as shown in FIG. 8, the at least one high-level feature extraction layer 802 includes at least one high-level feature extraction sublayer 8021 (in FIG. 8, descriptions are provided by taking the high-level feature extraction layer 802 including one high-level feature extraction sublayer 8021 as an example), and a high-level feature combination sublayer 8022. Step 1052 can be refined into the following steps, as shown in FIG. 10.

Step 10521: inputting the second low-level features into the at least one high-level feature extraction sublayer to obtain the second high-level features corresponding to the second low-level features and the second sub-low-level features in the second low-level features.

In the embodiment of the present disclosure, the high-level feature extraction sublayer is used to extract the second high-level features corresponding to the second low-level features from the second low-level features. The high-level feature extraction sublayer may also be used to select second sub-low-level features from the second low-level features for combination with the second high-level features. The second sub-low-level features are automatically selected by the high-level feature extraction sublayer. When the algorithms of the high-level feature extraction sublayer are different, the selected second sub-low-level features will also be different.

In the embodiment of the present disclosure, the high-level feature extraction layer may include multiple high-level feature extraction sublayers, and the multiple high-level feature extraction sublayers may be stacked arranged. When the high-level feature extraction layer includes multiple high-level feature extraction sublayers, the second low-level features are inputted into the multiple high-level feature extraction sublayers in proper order. The number of high-level feature extraction sublayers may be set according to actual conditions, which is not specifically limited in the embodiment of the present disclosure.

The high-level feature extraction sublayer performs processing on the second low-level features, and after obtaining the second high-level features and the second sub-low-level features, it is also used to suppress the low-level features except the second sub-low-level features in the second low-level features, and to input the second high-level features and the second sub-low-level features into the high-level feature combination sublayer.

Step 10522, inputting the second high-level features and the second sub-low-level features into the high-level feature combination sublayer, and linearly merging the second high-level features and the second sub-low-level features through the high-level feature combination sublayer to obtain the second combined features.

In the embodiment of the present disclosure, after obtaining the second high-level features and the second sub-low-level features, the high-level feature combination sublayer linearly merges the second high-level features and the second sub-low-level features, for example linearly adding the second high-level features to the second sub-low-level features, etc., to obtain second combined features, and inputs the second combined features into the synthesis output layer. The high-level feature combination sublayer may also combine the second high-level features with the second sub-low-level features in other ways, which is not specifically limited in the embodiment of the present disclosure.

Step 1053: inputting the second combined features into the synthesis output layer, and performing convolution processing on the second combined features through the synthesis output layer to obtain a target RAW image corresponding to the second combined features.

In the embodiment of the present disclosure, the synthesis output layer may include a convolution sublayer and a mapping sublayer. The convolution sublayer includes a convolution kernel of 5×5, which is then used to perform convolution processing on the second combined features to obtain the second combined features subjected to convolution. The convolution sublayer is used to make the preset neural network converge faster during the training process of the preset noise model. The convolution sublayer inputs the second combined features subjected to convolution into the mapping sublayer, and the mapping sublayer maps each feature in the second combined features to a corresponding position to obtain the target RAW image. The target RAW image contains the first preset noise and the second preset noise.

Figure 11:
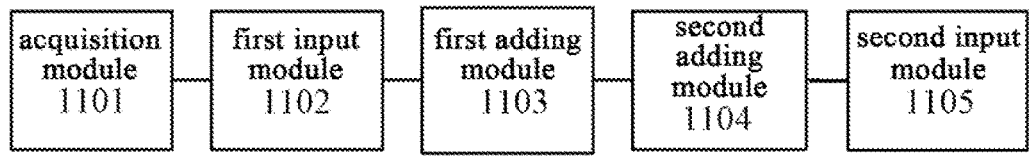
FIG. 11 is a structural diagram of an apparatus for acquiring a RAW image according to the embodiment of the present disclosure.

In order to solve the problem of lack of the training set of RAW images in training of an intelligent algorithm in the field of image processing, an embodiment of the present disclosure also provides an apparatus for acquiring a RAW image. As shown in FIG. 11, the apparatus for acquiring a RAW image includes:

an acquisition module 1101 configured for acquiring an sRGB image;

a first input module 1102 configured for inputting the sRGB image into a preset image restoration model to obtain an initial RAW image corresponding to the sRGB image, wherein the preset image restoration model is a model obtained by training a preset neural network based on a first preset training set, and the first preset training set includes a plurality of sample sRGB images and an initial RAW image corresponding to each of the sample sRGB images;

a first adding module 1103 configured for adding a first preset noise to the initial RAW image to obtain a first noise RAW image;

a second adding module 1104 configured for adding a second preset noise to the initial RAW image to obtain a second noise RAW image;

a second input module 1105 configured for inputting the first noise RAW image and the second noise RAW image into a preset noise addition model to obtain a target RAW image, wherein the preset noise addition model is a model obtained by training a preset neural network based on a second preset training set, and the second preset training set includes a plurality of first sample noise RAW images and a plurality of second sample noise RAW images, as well as a target RAW image corresponding to each of the first sample noise RAW images and the second sample noise RAW images.

In some embodiments, the preset image restoration model includes a first low-level feature extraction layer, at least one residual attention network layer, and an image recovery layer.

The first input module 1102 includes:

a first input sub-module configured for inputting the sRGB image into the first low-level feature extraction layer to obtain first low-level features corresponding to the sRGB image;

a second input sub-module configured for inputting the first low-level features into the at least one residual attention network layer to obtain first high-level features corresponding to the first low-level features, and to obtain first combined features determined according to the first low-level features and the first high-level features; and a third input sub-module used for inputting the first combined features into the image recovery layer to obtain the initial RAW image corresponding to the first combined features.

In some embodiments, the residual attention network layer includes at least one attention network sublayer, and a residual sublayer.

The second input sub-module is specifically used for:

inputting the first low-level features into the at least one the attention network sublayer to obtain the high-level features corresponding to the first low-level features and the first sub-low-level features in the first low-level features;

inputting the first high-level features and the first sub-low-level features into the residual sublayer, and linearly merging the first high-level features and the first sub-low-level features through the residual sublayer to obtain the first combined features.

In some embodiments, the image recovery layer includes an image convolution sublayer and a restoration sublayer.

The third input sub-module is specifically used for:

inputting the first combined features into the image convolution sublayer, and performing convolution processing on the combined features through the image convolution sublayer to obtain the first combined features subjected to convolution;

inputting the first combined features subjected to convolution into the restoration sublayer, and performing the sub-pixel convolution processing on the first combined features subjected to convolution by the restoration sublayer to obtain the initial RAW image corresponding to the first combined features subjected to convolution.

In some embodiments, the preset noise addition model includes a second low-level feature extraction layer, at least one high-level feature extraction layer, and a synthesis output layer.

The second input module 1103 includes:

a fourth input sub-module configured for inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image;

a fifth input sub-module configured for inputting the second low-level features into at least one high-level feature extraction layer to obtain second high-level features corresponding to the second low-level features, and to obtain second combined features determined according to the second low-level features and the second high-level features; and a sixth input sub-module configured for inputting the second combined features into the synthesis output layer, and performing convolution processing on the second combined features through the synthesis output layer to obtain a target RAW image corresponding to the second combined features.

In some embodiments, the second low-level feature extraction layer includes a low-level feature extraction sublayer and a low-level feature combination sublayer.

The fourth input sub-module is specifically used for:

inputting the first noise RAW image and the second noise RAW image into the low-level feature extraction sublayer, performing convolution processing on the first noise RAW image through the low-level feature extraction sublayer to obtain third low-level features of the first noise RAW image, and performing convolution processing on the second noise RAW image through the low-level feature extraction sublayer to obtain fourth low-level features of the second noise RAW image;

inputting the third low-level features and the fourth low-level features into the low-level feature combination sublayer, and linearly merging the third low-level features and the fourth low-level features through the low-level features combination sublayer to obtain the second low-level features.

In some embodiments, the at least one high-level feature extraction layer includes at least one high-level feature extraction sublayer, and a high-level feature combination sublayer.

The fifth input sub-module is specifically used for:

inputting the second low-level features into the at least one high-level feature extraction sublayer to obtain the second high-level features corresponding to the second low-level features, and second sub-low-level features in the second low-level features;

inputting the second high-level features and the second sub-low-level features into the high-level feature combination sublayer, and linearly merging the second high-level features and the second sub-low-level features through the high-level feature combination sublayer to obtain the second combined features.

Figure 12:
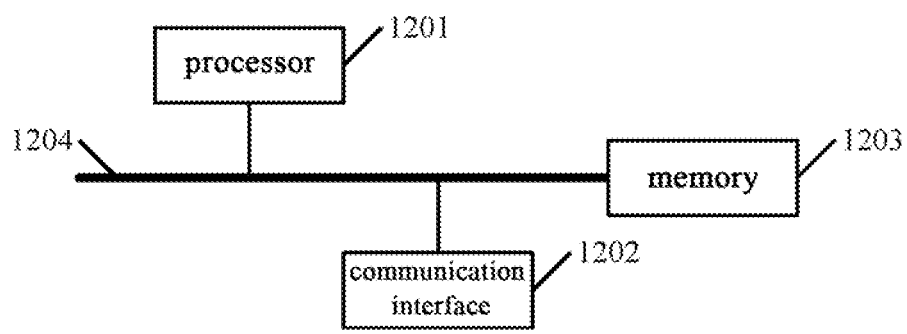
FIG. 12 is a structural diagram of an electronic device according to the embodiment of the present disclosure.

An embodiment of the present disclosure also provides an electronic device, as shown in FIG. 12, the electronic device includes a processor 1201, a communication interface 1202, a memory 1203 and a communication bus 1204, wherein the processor 1201, the communication interface 1202, and the memory 1203 communicate with each other through the communication bus 1204;

a memory 1203 is configured to store computer programs; and a processor 1201 is configured to implement the steps of any of the above-mentioned methods for acquiring a RAW image when executing the program stored in the memory 1203.

The communication bus mentioned in the above electronic device may be a Peripheral Component Interconnect (PCI) bus or an Extended Industry Standard Architecture (EISA) bus or the like. The communication bus can be divided into an address bus, a data bus, a control bus, and the like. For ease of presentation, only one thick line is used in the figure, but it does not mean that there is only one bus or one type of bus.

The communication interface is used for communication between the above electronic device and other devices.

The memory may include Random Access Memory (RAM), and may also include Non-Volatile Memory (NVM), such as at least one disk storage. Optionally, the memory may also be at least one storage device located away from the aforementioned processor.

The above-mentioned processor may be a general purpose processor, including Central Processing Unit (CPU), Network Processor (NP), etc. The above-mentioned processor may also be a Digital Signal Processor (DSP), an Application Specific Integrated Circuit (ASIC), a Field Programmable Gate Array (FPGA) or other programmable logic devices, discrete gates or transistor logic devices, discrete hardware components.

In another embodiment provided by the present disclosure, a computer-readable storage medium is also provided, in which computer programs are stored, and when the computer programs are executed by the processor, the steps of any of the above-mentioned methods for acquiring a RAW image are implemented.

In yet another embodiment provided by the present disclosure, it is also provided a computer program product containing instructions, which, when executed on a computer, cause the computer to implement any of the methods for acquiring a RAW image in the foregoing embodiments.

In the above-mentioned embodiments, it can be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, the procedures or functions described in accordance with the embodiments of the present disclosure are produced in whole or in part. The computer may be a general purpose computer, a dedicated computer, a computer network, or other programmable devices. The computer instructions may be stored in the computer-readable storage medium or transmitted from one computer-readable storage medium to another computer-readable storage medium. For example, the computer instructions can be transmitted from one website site, computer, server or data center to another website site, computer, server or data center by wire (e.g., coaxial cable, optical fiber, digital subscriber line (DSL)) or wireless (e.g., infrared, wireless, microwave, etc.). The computer-readable storage medium may be any available medium that can be accessed by a computer or a data storage device such as a server, a data center, etc. that includes an integration of one or more available media. The available media may be magnetic media (e.g., floppy disks, hard disks, magnetic tapes), optical media (e.g., DVD), or semiconductor media (e.g., Solid State Disk (SSD)), among others.

It should be noted that in the context relational terms such as first and second are only used to distinguish one entity or operation from another entity or operation, and do not necessarily require or imply any such actual relationship or order between these entities or operations. Moreover, the terms "include", "comprise" or any other variation thereof are intended to cover non-exclusive inclusion, so that a process, method, article or equipment including a series of elements includes not only those elements, but also other elements not explicitly listed, or elements inherent in such process, method, article or equipment. Without further restrictions, the elements defined by the statement "includes a . . . " do not exclude the existence of other same elements in the process, method, article or equipment including the elements.

Each embodiment in this specification is described in a relevant way. The same and similar parts of each embodiment can be referred to each other. Each embodiment focuses on the differences from other embodiments. In particular, for the device embodiment, the electronic device embodiment, the computer-readable storage medium embodiment, the computer program product embodiment and the computer program embodiment, since they are basically similar to the method embodiment, the description is relatively simple. For relevant parts, please refer to the partial description of the method embodiment.

The foregoing descriptions are only preferred embodiments of the present application, and are not used to limit the protection scope of the present application. Any modification, equivalent replacement, improvement, etc. made within the spirit and principle of the present application are all included in the protection scope of the present application.

The invention claimed is:

1. A method for acquiring a RAW image, comprising:
acquiring an sRGB image;
inputting the sRGB image into a preset image restoration model to obtain an initial RAW image corresponding to the sRGB image, wherein the preset image restoration model is a model obtained by training a preset neural network based on a first preset training set, and the first preset training set comprises a plurality of sample sRGB images and a labeled initial RAW image corresponding to each of the sample sRGB images;
adding a first preset noise to the initial RAW image to obtain a first noise RAW image;
adding a second preset noise to the initial RAW image to obtain a second noise RAW image; and
inputting the first noise RAW image and the second noise RAW image into a preset noise addition model to obtain a target RAW image, wherein the preset noise addition model is a model obtained by training a preset neural network based on a second preset training set, and the second preset training set comprises a plurality of first sample noise RAW images and a plurality of second sample noise RAW images, and a labeled target RAW image corresponding to each of the first sample noise RAW images and the second sample noise RAW images;
wherein the preset image restoration model comprises a first low-level feature extraction layer, at least one residual attention network layer, and an image recovery layer;
the inputting the sRGB image into the preset image restoration model to obtain the initial RAW image corresponding to the sRGB image comprises:
inputting the sRGB image into the first low-level feature extraction layer to obtain first low-level features corresponding to the sRGB image;
inputting the first low-level features into the at least one residual attention network layer to obtain first high-level features corresponding to the first low-level features, and to obtain first combined features determined according to the first low-level features and the first high-level features; and inputting the first combined features into the image recovery layer to obtain the initial RAW image corresponding to the first combined features;

or, wherein the preset noise addition model comprises a second low-level feature extraction layer, at least one high-level feature extraction layer, and a synthesis output layer;

the inputting the first noise RAW image and the second noise RAW image into the preset noise addition model to obtain the target RAW image comprises:

inputting the first noise RAW image and the second noise RAW image into the second low-level feature extraction layer, and performing convolution processing on the first noise RAW image and the second noise RAW image through the second low-level feature extraction layer to obtain second low-level features of the first noise RAW image and the second noise RAW image;

inputting the second low-level features into the at least one high-level feature extraction layer to obtain second high-level features corresponding to the second low-level features, and to obtain second combined features determined according to the second low-level features and the second high-level features; and inputting the second combined features into the synthesis output layer, and performing the convolution processing on the second combined features through the synthesis output layer to obtain the target RAW image corresponding to the second combined features.

2. The method for acquiring a RAW image according to claim 1, wherein the residual attention network layer comprises at least one attention network sublayer and a residual sublayer;

the inputting the first low-level features into the at least one residual attention network layer to obtain the first high-level features corresponding to the first low-level features and to obtain the first combined features determined according to the first low-level features and the first high-level features comprises:

inputting the first low-level features into the at least one attention network sublayer to obtain the first high-level features corresponding to the first low-level features, and first sub-low-level features in the first low-level features; and inputting the first high-level features and the first sub-low-level features into the residual sublayer, and linearly merging the first high-level features and the first sub-low-level features through the residual sublayer to obtain the first combined features.

3. The method for acquiring a RAW image according to claim 1, wherein the image recovery layer comprises a convolution sublayer and a restoration sublayer;

the inputting the first combined features into the image recovery layer to obtain the initial RAW image corresponding to the first combined features comprises:

inputting the first combined features into the convolution sublayer, and performing the convolution processing on the first combined features through the convolution sublayer to obtain first combined features subjected to convolution; and inputting the first combined features subjected to convolution into the restoration sublayer, and performing sub-pixel convolution processing on the first combined features subjected to convolution through the restoration sublayer to obtain the initial RAW image corresponding to the first combined features subjected to convolution.

4. The method for acquiring a RAW image according to claim 1, wherein the second low-level feature extraction layer comprises a low-level feature extraction sublayer and a low-level feature combination sublayer;

the inputting the first noise RAW image and the second noise RAW image into the second low-level feature extraction layer, and performing the convolution processing on the first noise RAW image and the second noise RAW image through the second low-level feature extraction layer to obtain the second low-level features of the first noise RAW image and the second noise RAW image comprises:

inputting the first noise RAW image and the second noise RAW image into the low-level feature extraction sublayer, performing the convolution processing on the first noise RAW image through the low-level feature extraction sublayer to obtain third low-level features of the first noise RAW image, and performing the convolution processing on the second noise RAW image through the low-level feature extraction sublayer to obtain fourth low-level features of the second noise RAW image; and inputting the third low-level features and the fourth low-level features into the low-level feature combination sublayer, and linearly merging the third low-level features and the fourth low-level features through the low-level feature combination sublayer to obtain the second low-level features.

5. The method for acquiring a RAW image according to claim 1, wherein the at least one high-level feature extraction layer comprises at least one high-level feature extraction sublayer and a high-level feature combination sublayer;

the inputting the second low-level features into the at least one high-level feature extraction layer to obtain the second high-level features corresponding to the second low-level features and to obtain the second combined features determined according to the second low-level features and the second high-level features comprises:

inputting the second low-level features into the at least one high-level feature extraction sublayer to obtain second high-level features corresponding to the second low-level features, and to obtain second sub-low-level features in the second low-level features; and inputting the second high-level features and the second sub-low-level features into the high-level feature combination sublayer, and linearly merging the second high-level features and the second sub-low-level features through the high-level feature combination sublayer to obtain the second combined features.

6. An electronic device comprising a processor, a communication interface, a memory, and a communication bus, wherein the processor, the communication interface, and the memory communicate with each other through the communication bus; wherein the memory is configured for storing computer programs; and the processor is configured for implementing steps of the method according to claim 1 when executing the programs stored in the memory.

* * * * *